April 11, 1967 R. L. GOWER 3,313,335
TIRE CHAINS
Filed June 4, 1965
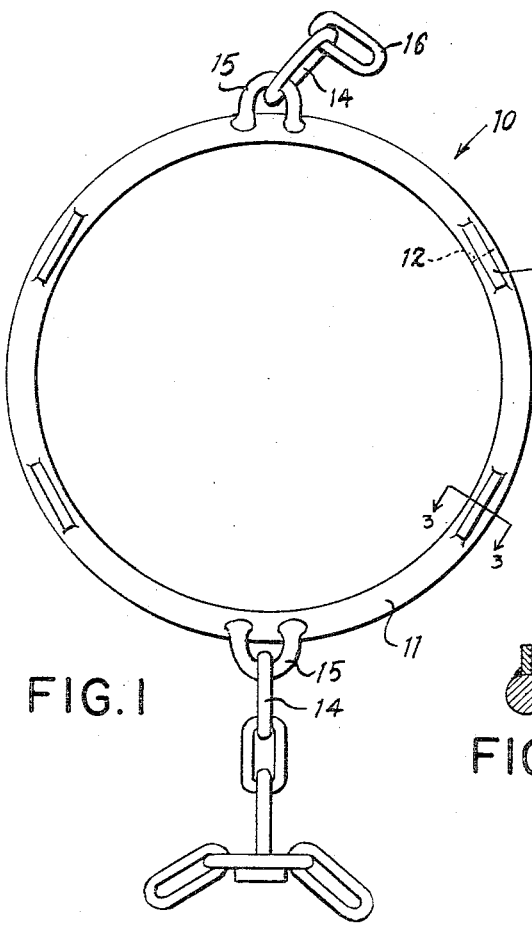
FIG. 1
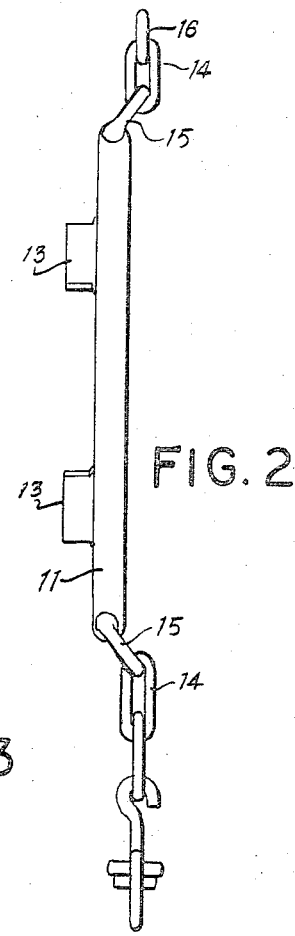
FIG. 2
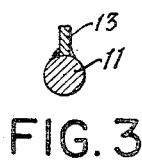
FIG. 3
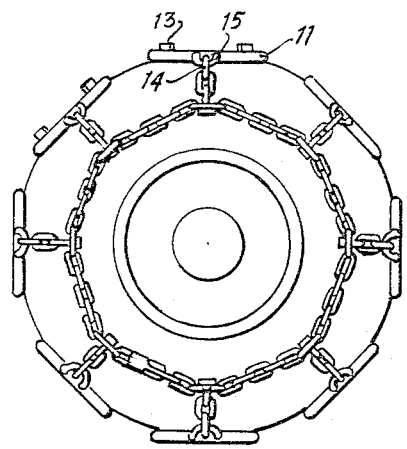
FIG. 4
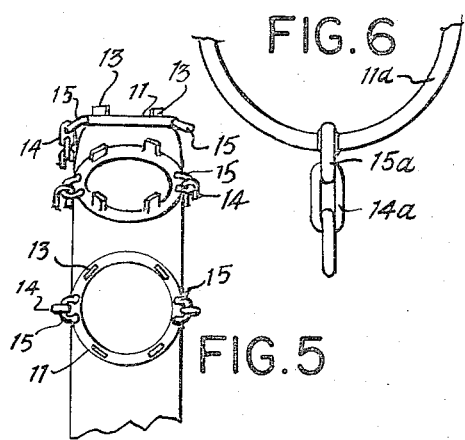
FIG. 5
FIG. 6
INVENTOR.
ROGER L. GOWER
BY
ATTORNEY

United States Patent Office 3,313,335
Patented Apr. 11, 1967

3,313,335
TIRE CHAINS
Roger L. Gower, P.O. Box 65, Canaan, Maine 04924
Filed June 4, 1965, Ser. No. 461,350
1 Claim. (Cl. 152—229)

This invention relates to new and useful improvements in tire chains, and more especially to tractor tire chains, and it has among its objects to provide a chain that would more closely fit a tire than any of those now commonly used.

Based upon prolonged tests, it appears that the tire chain forming the subject of this invention is not only most practical in operation, but also greatly resistant to wear and tear.

Some of the further distinct advantages are that said tires cannot slip inside the chains, and that said chains cannot slip into tire grooves; the said tires will work well in snow, mud and ice, and do not plug up or freeze up; further, they eliminate changes of broken axles and differentials because they keep slipping wheels from catching and snapping.

Another advantage resides in the fact that in the operation, according to my invention, only two attaching chains are used for attaching a ring member to the sidewall chain, thereby providing a more compact fitting of same, and avoiding wobbling and excessive movement of said parts, thus eliminating excessive wear among the latter.

A ring member consists of a rod of circular cross-section welded together at a point above which a road-gripping member is also welded, thus making said joint practically unbreakable.

In this invention the first link, or the one integrally attached to the ring member, which link is of a half-size, as well as the opposite link, which also is of a half-size, are horizontally disposed at an angle of about 30 degrees to said ring member in a downward direction, to the effect that said links in operation of the invention will align substantially with the tire sidewall chain.

Contrary to my arrangement, the chains now commonly used have four attaching chains per ring, and the connecting links on each are attached to the rings in an upright or vertical position.

With the above and other objects in view, this invention consists of the novel features, combination and arrangement of parts, hereinafter fully described, claimed and illustrated in the accompanying drawings, forming part of this application, in which similar characters of reference indicate corresponding parts in all views, and in which:

FIGURE 1 is a plan view of the ring section of a tire chain.

FIGURE 2 is an elongational side view of a tire chain.

FIGURE 3 is a cross-section taken on the line 3—3 in FIGURE 1.

FIGURE 4 is a side elevational view showing a tire chain attached to an automobile wheel, and FIGURE 5 is a top plan view, in part, of the illustration in FIGURE 4; while FIGURE 6 shows a different construction irrelevant to the present invention, aside from a comparison with the latter.

Referring more particularly to the drawings, the numeral 10 indicates a ring member of a tire chain; said ring is made from a rod bent upon itself and welded together, as shown in dotted lines at 12 in FIGURE 1.

As illustrated, road-gripping members 13 are welded to said ring 10 in spaced relationship, and one of said members is also welded to said ring 10 at a point, and over the spot, where the ends of the rod meet to form the ring, thus making said joint substantially unbreakable.

The chains 14, being of any convenient shape, are in the present invention connected to the ring member 10 by means of half-size links 15, which are welded to said ring at about a 30-degree angle in a downward direction, by which arrangement said half-size links in operation will be in substantial alignment with the tire sidewall chains.

The tire rings and chains are detachably connected in any convenient manner.

The arrangement in FIGURE 6 thus shows a connecting link 15a between the ring member 11a and a short side chain 14a, which latter connects said ring to the tire sidewall chains of a wheel (not shown).

The said connecting link 15a, which is of a whole-size, and vertically arranged (compare with my half-size link 15 horizontally disposed), constitutes an important difference from the construction of my invention, as said links 15a, as disclosed, exposes the aforesaid joint with its protruding edges (not shown) to unavoidable breakage, when traveling on rocky roads, besides considerable wear and tear in general.

It is obvious that changes may be made in the form and construction shown and described herein, within the scope of the appended claim, and I do not, therefore, wish to confine myself to the exact disclosure set forth herein.

What I claim as my invention, and wish to secure by Letters Patent of the United States is:

In an automobile tire chain, a ring made from a rod and bent upon itself and welded together, a plurality of road gripping members being welded to the latter, one of said members being welded over the spot where said rod is welded together, thereby forming a substantially unbreakable joint and a half-size link welded horizontally to said ring in a downward direction at an angle of approximately 30 degrees to the latter, a short sidechain connecting said half-size link with the side wall chain of a tire, causing, in operation, said half-size link to be in substantial alignment with said side wall chain of the tire.

References Cited by the Examiner

UNITED STATES PATENTS

| 1,733,193 | 10/1929 | Hall | 152—245 |
| 3,034,556 | 5/1962 | Boilard | 152—229 |

FOREIGN PATENTS 497,836  6/1956  Canada.

ARTHUR L. LA POINT, *Primary Examiner.*

C. W. HAEFELE, *Assistant Examiner.*